United States Patent [19]
Parsons

[11] Patent Number: 5,382,120
[45] Date of Patent: Jan. 17, 1995

[54] DRILL BIT DEPTH MINDER

[76] Inventor: Richard E. Parsons, 835 Oak La., Escondida, Calif. 92029

[21] Appl. No.: 173,127

[22] Filed: Dec. 27, 1993

[51] Int. Cl.⁶ .................. B23B 49/00; G01B 5/14
[52] U.S. Cl. .................................. 408/16; 33/201; 33/638; 33/833; 408/202; 408/241.5
[58] Field of Search ............... 33/201, 571, 626, 628, 33/636, 638, 639, 832, 833, 838; 408/16, 113, 116, 202, 241 R, 241 S; 279/105.1

[56] References Cited
U.S. PATENT DOCUMENTS

| | | | |
|---|---|---|---|
| 2,716,030 | 8/1955 | Faso | 279/105.1 |
| 2,886,895 | 5/1959 | Kushion | 33/636 |
| 3,911,587 | 10/1975 | Forrest et al. | 33/201 X |
| 5,040,309 | 8/1991 | Hayden et al. | 33/833 |

*Primary Examiner*—Steven C. Bishop

[57] ABSTRACT

The present invention relates to a device that is hand held and independent of a drill, either hand held or powered by electricity. This device consists of a tubular housing with a turn screw plunger shaft and a scale for measurement in inches on one side and metric on the other side of a liner window opening on one side of said tubular housing The user selects the depth of the hole to be drilled, sets the turn screw to that depth as indicated on the outside scale. The leading end of a drill bit is then inserted in the receiving end opening in the tubular housing that is opposite to the turn screw plunger. Thereafter, a collar with a set screw is placed over the flat end of the bit and secured by the set screw to the bit at the receiving end wall of the device of the present invention. The bit, on which the set screw collar is secured, may then be inserted in any type of drill and when used will drill only to the depth of the collar as measured and set by the device of the present invention.

4 Claims, 1 Drawing Sheet

DRILL BIT DEPTH MINDER

FIELD OF THE INVENTION

The present invention is related to the field of drills, be they hand operated or electric, as well as the bit used therewith to insure accuracy in depths drilled.

BACKGROUND OF THE INVENTION

The present invention was developed in order to simplify the task of drilling holes to a pre-determined depth. Drill bits are widely used in the construction, carpentry, woodworking, metal working trades and the like. Drilling, in particular, is a common operation for forming a cylindrical hole with a straight -fluted or twist drill.

Machines used in drilling include manually operated and power drills, as well as various types of drilling machines such as a bench drill press, an upright drill press, and a radial drill press. In all of these drilling machines, a drill bit is used to drill the hole, and many times, these holes are drilled only to a specific depth.

For wood drilling, in particular, it is often necessary to drill only to a specific depth. For example, the installation of a door hinge and the like, where it is not wanted to drill all the way through. Furthermore, it is desired to drill to a sufficient depth for the screws to be set for purposes of strength of setting the screw.

Various drill stops and drill stop collars have been developed to limit the depth the drill bit enters the wood, or the material to be drilled. However, the drill stops previously developed do not always give the desired precision depth of drill and in most cases complicated to use and are not easy to manufacture or to use at either a job site, a shop or at home. It has also been very difficult to measure and mark the depth on a round drill bit. The following is a list of related patents, however none of the cited patents disclose or even suggest the device of the present invention, a tubular housing, a precision turn screw depth setting shaft, and a set screw collar.

U.S. Pat. No. 4,813,822, issued to Biek on Mar. 21, 1989
U S. Pat. No. 4,961,674, issued to Wang et al on Oct. 9, 1990
U.S. Pat. No. 5,078,552, issued to Albel on Jan. 7, 1992
U.S. Pat. No. 5,147,164, issued to Fraver on Sept. 15, 1992

OBJECTS OF THE PRESENT INVENTION

The object of the present invention is to provide a drill bit depth regulating device that is applicable to both hand and power drills Another object of the present invention is to provide a drill bit depth regulating device is hand held and is independent of the drill itself.

An additional object of the present invention is to provide a drill bit depth regulating device that is precise in measurement and holds that measurement throughout the drilling process.

DISCLOSURE OF THE INVENTION

These and other objects of the present invention are accomplished by the device of the present invention that allows the drilling of a hole in wood or other material to a desired precision depth and this can be done in the shop, in the home or even in the field because the device of the present invention.

The drill bit depth setting device of the present invention is used by setting the turn screw to the desired depth scale that is engraved in both English on one side and Metric measurements on the other, the drilling end of said bit is inserted in the open end of the device of the present invention and placed flush against the wall of the said set turn screw, the user the placing the collar over the flat end of said bit and slides the collar up flush to the end wall of the device and then secures said collar in place on said drill bit. The drill bit can then be inserted in a drill, hand or power, and the user will drill all the holes he wants precisely to the pre-selected depth.

BRIEF DESCRIPTION OF THE DRAWINGS

The present invention will be further described in connection with the attached drawings showing preferred embodiments of the present invention, including specific parts and arrangements of parts. It is intended that the drawings be included as a part of this specification and to be illustrative of the preferred embodiments of the present invention and should in no way be considered as a limitation on the scope of the invention. However, the present invention will become more clear by making a thorough and complete review and study of the following description of the best mode and the preferred embodiment of carrying out the novel and unique device of the present invention, particularly when taken in conjunction with the drawings, which constitute part hereof, wherein.

DETAILED DESCRIPTION OF THE PREFERRED EMBODIMENTS

Figure 1:
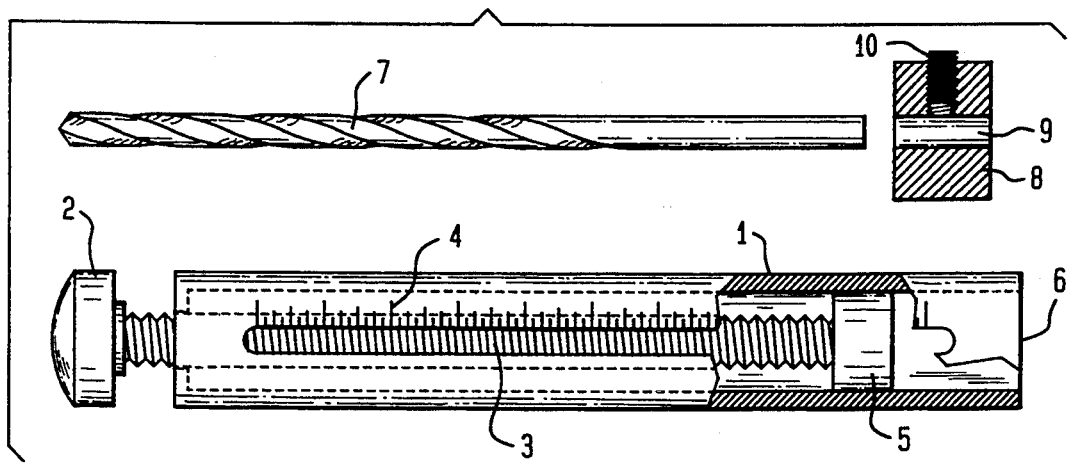
FIG. 1 is a partial cross sectional view of the device of the present invention along with a full cross section view of the collar and the set screw. A drill bit is also shown.

Referring now in detail to the drawings, FIG. 1 illustrates the drill bit minder stop of the present invention in the preferred embodiment wherein a separate drill bit is at 7, the body of the drill minder is at 1, the thumb screw is at 2, the threaded rod is at 3 and is attached to thumb screw 2. As the thumb screw 2 is turned the stop disk 5 is set to the desired depth on measurement scale 4.

In another embodiment of the present invention the measurement scale 4 can be set to read in inches on one side of the viewer next to the measurement scale 4 and metric on the other side.

Figure 2:
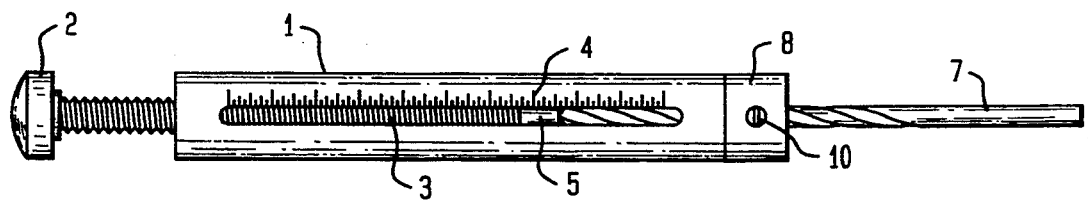
FIG. 2 is a plan side view of the device of the present invention with the drill bit and collar in place.

In the operation of the preferred embodiment of the present invention FIG. 2 shows the drill bit 7 inserted through collar shaft 9 and into the opening 6 of the drill bit minder body 1 to meet the stop disk 5 that was preset to the desired depth on scale 4, there after the collar 8 is set in place on drill bit 7 by tightening set screw 10.

Figure 3:
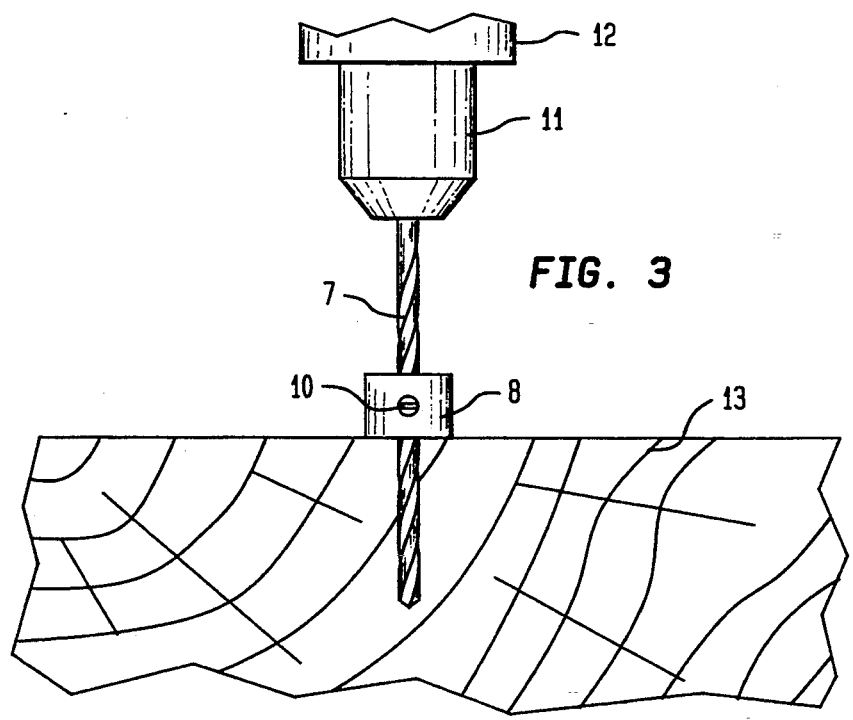
FIG. 3 shows the drill bit in a drill chuck and the collar on the bit as it is stopped in the wood.

The drill bit with the collar thereon is then put in a drill chuck as is shown in FIG. 3 where the drill is at 12, the drill chuck is at 11 with the drill bit 8 thereon and having the set screw 10 in place to the desired position. FIG. 3 shows the drill bit stopped at the desired depth in the wood 13 by collar 8.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims.

What is claimed is:

1. A device to limit a drill bit's entry to a predetermined depth into material which comprises an elongated body with a thumb screw attached to one end of a threaded rod, said body adapted to threadably receive said threaded rod on one end of said body, a stop disk fitted to another end of said threaded rod, an opening on another end of said elongated body, an elongated opening on a side of said body wherein said thumb screw is adapted to turn in order to set said stop disk at a predetermined depth as shown on at least one scale adjacent to said elongated opening on said body, a stop collar adapted to receive a drill bit therein, said stop collar adapted to become adjacent to said opening on said another end of said elongated body so that said drill bit can engage a face of said stop disk to allow a set screw to position said stop collar to a measured depth on said drill bit.

2. The device of claim 1 wherein said scale is in English measurements.

3. The device of claim 1 wherein said scale is in Metric measurements.

4. The device of claim 1 wherein said stop collar is attached to said drill bit and said stop collar is adapted to stop drilling at a predetermined depth.

* * * * *